US007565513B2

(12) United States Patent
Ahmed et al.

(10) Patent No.: US 7,565,513 B2
(45) Date of Patent: Jul. 21, 2009

(54) PROCESSOR WITH POWER SAVING RECONFIGURABLE FLOATING POINT UNIT DECODING AN INSTRUCTION TO SINGLE FULL BIT OPERATION OR MULTIPLE REDUCED BIT OPERATIONS

(75) Inventors: Ashraf Ahmed, Austin, TX (US); Kelvin Domnic Goveas, Austin, TX (US); Michael Clark, Austin, TX (US); Jelena Ilic, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 182 days.

(21) Appl. No.: 11/680,331

(22) Filed: Feb. 28, 2007

(65) Prior Publication Data

US 2008/0209184 A1 Aug. 28, 2008

(51) Int. Cl.
*G06F 9/302* (2006.01)
(52) U.S. Cl. .................. 712/222; 712/209; 713/324
(58) Field of Classification Search ........... None
See application file for complete search history.

(56) References Cited

U.S. PATENT DOCUMENTS

| 5,574,928 | A   | * | 11/1996 | White et al. ............... 712/23 |
|-----------|-----|---|---------|------------------------------------|
| 5,590,365 | A   |   | 12/1996 | Ide et al.                         |
| 6,308,252 | B1  | * | 10/2001 | Agarwal et al. ............ 712/22 |
| 6,732,259 | B1  |   | 5/2004  | Thekkath et al.                    |
| 6,925,553 | B2  | * | 8/2005  | Roussel et al. ............ 712/245 |
| 2002/0032848 | A1 |   | 3/2002  | Liao et al.                        |
| 2005/0273582 | A1 | * | 12/2005 | Wilson ..................... 712/241 |

OTHER PUBLICATIONS

IDE, A 320-MFLOPS CMOS Floating-Point Processing Unit for Superscalar Processors, 8107 IEEE Journal of Solid-State Circuit Mar. 28, 1993, No. 3, New Yourk, US, pp. 352-360.
PCT International Search Report, mailed Jun. 17, 2008, 4 pages.

* cited by examiner

*Primary Examiner*—Kenneth S Kim

(57) ABSTRACT

A technique of operating a processor includes determining whether a floating point unit (FPU) of the processor is to operate in a full-bit mode or a reduced-bit mode. An instruction is fetched and the instruction is decoded into a single operation, when the full-bit mode is indicated, or multiple operations, when the reduced-bit mode is indicated.

20 Claims, 3 Drawing Sheets

PROCESSOR WITH POWER SAVING RECONFIGURABLE FLOATING POINT UNIT DECODING AN INSTRUCTION TO SINGLE FULL BIT OPERATION OR MULTIPLE REDUCED BIT OPERATIONS

BACKGROUND

1. Field of the Disclosure

The present disclosure is generally directed to a processor and, more particularly, a processor with a reconfigurable floating point unit.

2. Description of the Related Art

As is well known, a floating point unit (FPU) is a part of a processor system that is specially designed to carry out operations on floating point numbers. Typical floating point operations include addition, subtraction, multiplication, division, and square root. Some processor systems may also perform various transcendental functions, such as exponential or trigonometric calculations, though in most modern processors these are done with software library routines. In most modern general purpose computer architectures, an FPU includes multiple execution units. In these architectures, floating point operations are usually performed independently of integer operations and are generally pipelined. Execution units of an FPU may be specialized, and divided between simpler operations (e.g., addition and multiplication) and more complicated operations (e.g., division). In some cases, only the simple operations are implemented in hardware, while the more complex operations are emulated.

As is well known, an instruction set defines instructions that a processor can execute. Instructions include arithmetic instructions (e.g., add and subtract), logic instructions (e.g., AND, OR, and NOT instructions), and data instructions (e.g., move, input, output, load, and store instructions). An instruction set, or instruction set architecture (ISA), is the part of the processor architecture related to programming, including native data types, instructions, registers, addressing modes, memory architecture, interrupt and exception handling, and external input/output (I/O). An ISA includes a specification of a set of opcodes (operational codes), i.e., native commands implemented by a particular central processing unit (CPU) architecture. As is well known, an opcode is the portion of a machine language instruction that specifies the operation to be performed. A complete machine language instruction contains an opcode and, usually, specifies one or more operands, i.e., data for the operation to act upon. The operands upon which opcodes operate may, depending on the CPU architecture, consist of registers, values in memory, values stored in a stack, I/O ports, a data bus, etc.

As is well known, computers with different microarchitectures can share a common instruction set. For example, processors from different manufacturers may implement nearly identical versions of an instruction set, e.g., an x86 instruction set, but have substantially different internal designs. Typical complex instruction set computers (CISCs) have instructions that combine one or two basic operations (such as "add" and "multiply") with implicit instructions for accessing memory, incrementing registers upon use, or de-referencing locations stored in memory or registers. Reduced instruction-set computers (RISC) trade off simpler and faster instruction set implementations for lower code density (that is, more program memory space to implement a given task). RISC instructions typically implement only a single implicit operation, such as an "add" of two registers or the "load" of a memory location into a register.

A number of different instruction sets have been employed in x86 type processors over the years. For example, the matrix math extension (MMX) instruction set was introduced in 1997. In general, as the MMX was designed to re-use existing floating point registers of prior CPU designs, a CPU executing an MMX instruction could not work on floating point and single-instruction multiple-data (SIMD) type data at the same time. Furthermore, the MMX instruction set was only designed to work on integers. The streaming SIMD extension (SSE) instruction set was introduced in 1999 to add to the functionality of the MMX instruction set. The SSE instruction set added eight new 128-bit registers, referred to as XMM0 through XMM7. Each 128-bit register packed together four 32-bit single-precision floating point numbers. In the SSE instruction set, the 128-bit registers are disabled by default until an operating system explicitly enables them and are additional program states that the operating system is required to preserve across task switches. Due to the addition of floating point support, the SSE instruction set (and later versions of the SSE instruction set) is more widely used than the MMX instruction set.

The SSE2 instruction set added new math instructions for double-precision (64-bit) floating point and 8/16/32-bit integer data types, all operating on the same 128-bit XMM vector register file previously introduced with SSE. The SSE3 instruction set added a handful of digital signal processor (DSP) oriented mathematical instructions and some process (thread) management instructions to the SSE2 instruction set. The SSSE3 instruction set added sixteen new opcodes (to the SSE3 instruction set), which included permuting bytes in a word, multiplying 16-bit fixed-point numbers with correct rounding and within word accumulate instructions. The SSE4 instruction set added a dot product instruction, additional integer instructions, etc.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
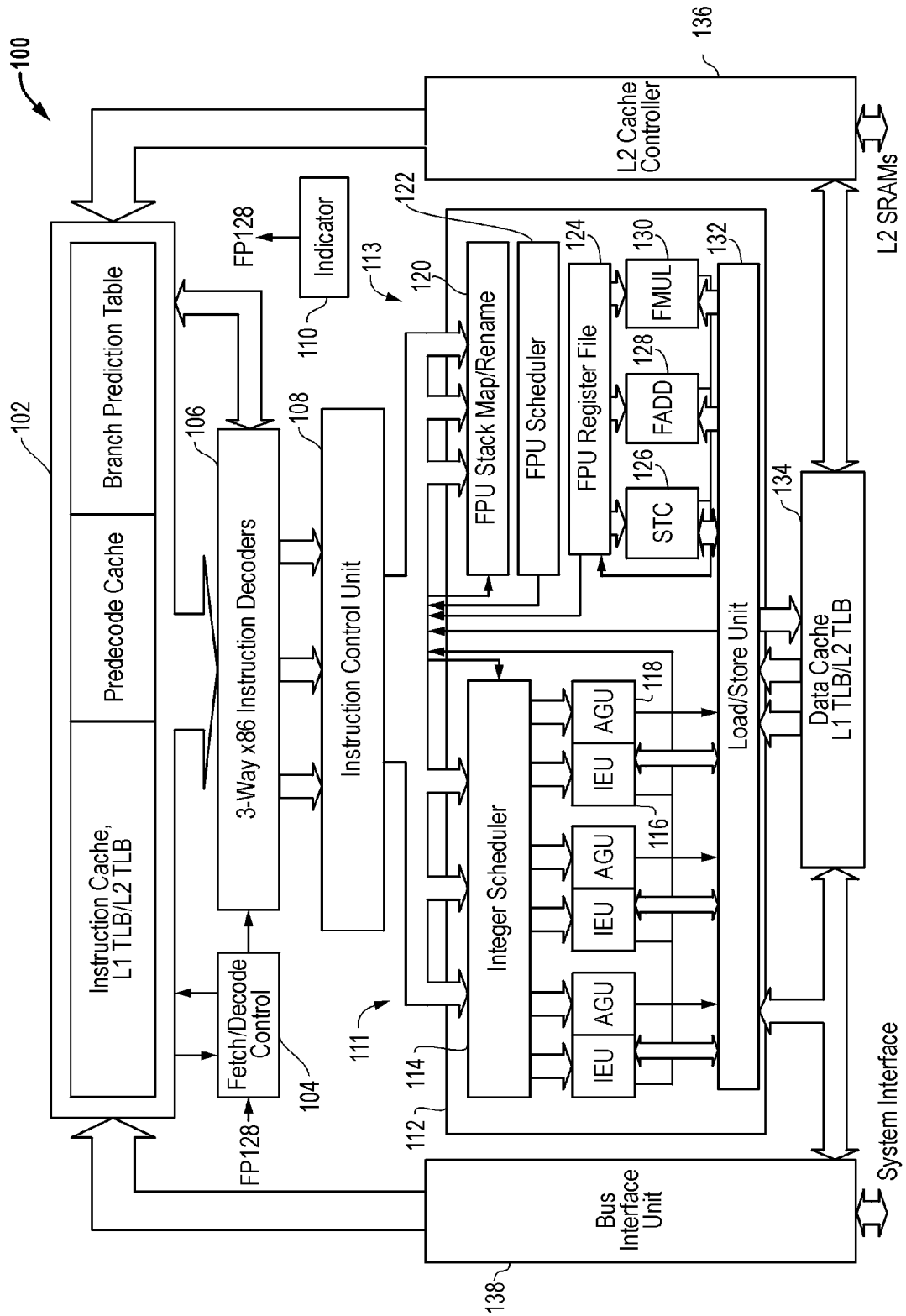
FIG. 1 is an electrical block diagram of a relevant portion of a processor that is configured according to an embodiment of the present disclosure.

According to various aspects of the present disclosure, a processor design is disclosed that includes a floating point unit (FPU) that includes a common control section and two substantially identical 64-bit data paths, i.e., a top data path and a bottom data path, that are used to execute floating point instructions of a 128-bit instruction set. The control section is configured via an indicator, e.g., a mode bit, to execute the 128-bit instruction set on either a 128-bit data path, including the top and bottom data paths, or on the bottom data path. The processor design provides for a processor chip having three different configurations, i.e., a processor chip having a 128-bit FPU for maximum performance, a processor chip having a 64-bit FPU for reduced power consumption, or a processor chip having a 128-bit FPU which can be dynamically down-binned to a 64-bit FPU for lower power consumption. In a processor chip that can be down-binned, the down-binning may be done at boot-up or at run-time, based upon power requirements.

Advantageously, the processor design employs a common control section (logic), e.g., one or more front-end decoders, a floating point (FP) rename unit, a FP scheduling unit, a FP exception and pipeline control unit, and a FP retire unit, that is common between the different configurations. In any case, the front-end decoders are configured to crack a 128-bit instruction into either a single 128-bit native operation, or two 64-bit operations, depending upon the mode bit. The single-instruction multiple-data (SIMD) nature of many instruction sets allows the top data path to be a duplicate of the bottom data path. As noted above, both the top and bottom data paths have a common control section (interface), which allows the same blocks to be used in a 64-bit data path and a 128-bit data path. For the 128-bit data path, native operations are remapped to two 64-bit half operations (hops), i.e., a high hop (hi hop) and a low hop (lo hop), which are provided to the top and bottom data paths, respectively. For the 64-bit data path, a native operation is converted directly to one 64-bit half operation (i.e., a lo hop).

For non-SIMD instructions that operate on 128-bit data, a bypass unit is implemented to shuffle data between the top and bottom data paths such that 128-bit shuffle, pack, and unpack instructions can be properly executed. The bypass unit is configured to forward between data path blocks in the same data path, e.g., between a bottom FP adder and a bottom FP multiplier, as well as read data from either register file in the top and bottom data paths. As is used herein the term "coupled" includes both a direct electrical connection between elements (or units) and an indirect electrical connection between elements (or units) achieved with one or more intervening elements (or units).

According to one aspect of the disclosure, a method of operating a processor includes determining whether a floating point unit (FPU) of the processor is to operate in full-bit mode or a reduced-bit mode. A fetched instruction is decoded into a single operation, when the full-bit mode is indicated, or multiple operations, when the reduced-bit mode is indicated. For example, the full-bit mode may be a 128-bit mode and the reduced-bit mode may be a 64-bit mode. As another example, the full-bit mode may be a 256-bit mode and the reduced-bit mode may be a 32-bit mode. As yet another example, the full-bit mode may be a 128-bit mode and the reduced-bit mode may be a 32-bit mode.

According to another aspect of the disclosure, a processor includes an indicator, a decoder, and a floating point unit (FPU). The decoder is coupled to the indicator and is configured to decode an instruction into a single operation or multiple operations based on the indicator. The FPU is coupled to the decoder and is configured to begin execution of the single operation in one processor cycle or the multiple operations in one or more processor cycles based on the indicator.

According to yet another aspect of the disclosure, a system includes an indicator, a processor, and a memory subsystem, which is coupled to the processor. The processor includes a decoder and a floating point unit (FPU). The decoder is coupled to the indicator and is configured to decode an instruction into a single operation or multiple operations based on the indicator. The FPU is coupled to the decoder and is configured to begin execution of the single operation in one processor cycle or the multiple operations in one or more processor cycles based on the indicator.

With reference to FIG. 1, a relevant portion of a processor 100 that includes a reconfigurable floating point unit (FPU) is illustrated. The processor 100 includes a cache memory (cache) 102 that functions as an instruction cache. In one or more embodiments, the cache 102 incorporates a level 1 (L1) translation look-aside buffer (TLB), a level 2 (L2) TLB, a pre-decode cache, and a branch prediction table. The cache 102 is coupled to a bus interface unit (BIU) 138 and an L2 cache controller 136. A fetch/decode control unit 104, which is coupled to the cache 102 and instruction decoders 106, receives a configuration signal (FP128 signal) from an indicator 110, which may correspond to a register, a fuse, etc. A logic level of the FP128 signal determines whether the processor 100 operates in 128-bit mode or 64-bit mode. While the discussion herein is primarily directed to a processor operating in a 128-bit mode or a 64-bit mode, it is contemplated that the disclosed techniques are equally applicable to different modes, e.g., a 256-bit mode and a 128-bit mode. The fetch/decode control unit 104 controls instruction fetching from the cache 102 and controls instruction decoding by the instruction decoders 106. Decoded instructions are provided from the instruction decoders 106 to an instruction control unit (ICU) 108, which, among other functions, determines whether a decoded instruction (operation) should be dispatched to an integer unit 111 or a floating point unit (FPU) 113 of an out-of-order execution unit 112.

The integer unit 111 includes an integer scheduler 114, which is coupled to a plurality of integer execution units (IEUs) 116, which execute integer operations, and a plurality of address generation units (AGUs) 118, which generate addresses for integer operations. The IEUs 116 and the AGUs 118 are also coupled to a load/store (LS) unit 132, which is coupled to a cache 134. The cache 134 functions as a data cache and may implement an L1 TLB and an L2 TLB. The cache 134 is coupled to the BIU 138 and the L2 cache controller 136. The FPU 113 includes an FPU stack map/rename unit 120, an FPU scheduler 122, and an FPU register file 124. The FPU register file 124 is coupled to three logical pipes, i.e., a store control (STC) pipe 126, a floating point addition (FADD) pipe 128, and a floating point multiplication (FMUL) pipe 130, each of which may include one or more execution units that have multiple stages. The three logical pipes are also coupled to the LS unit 132.

Figure 2:
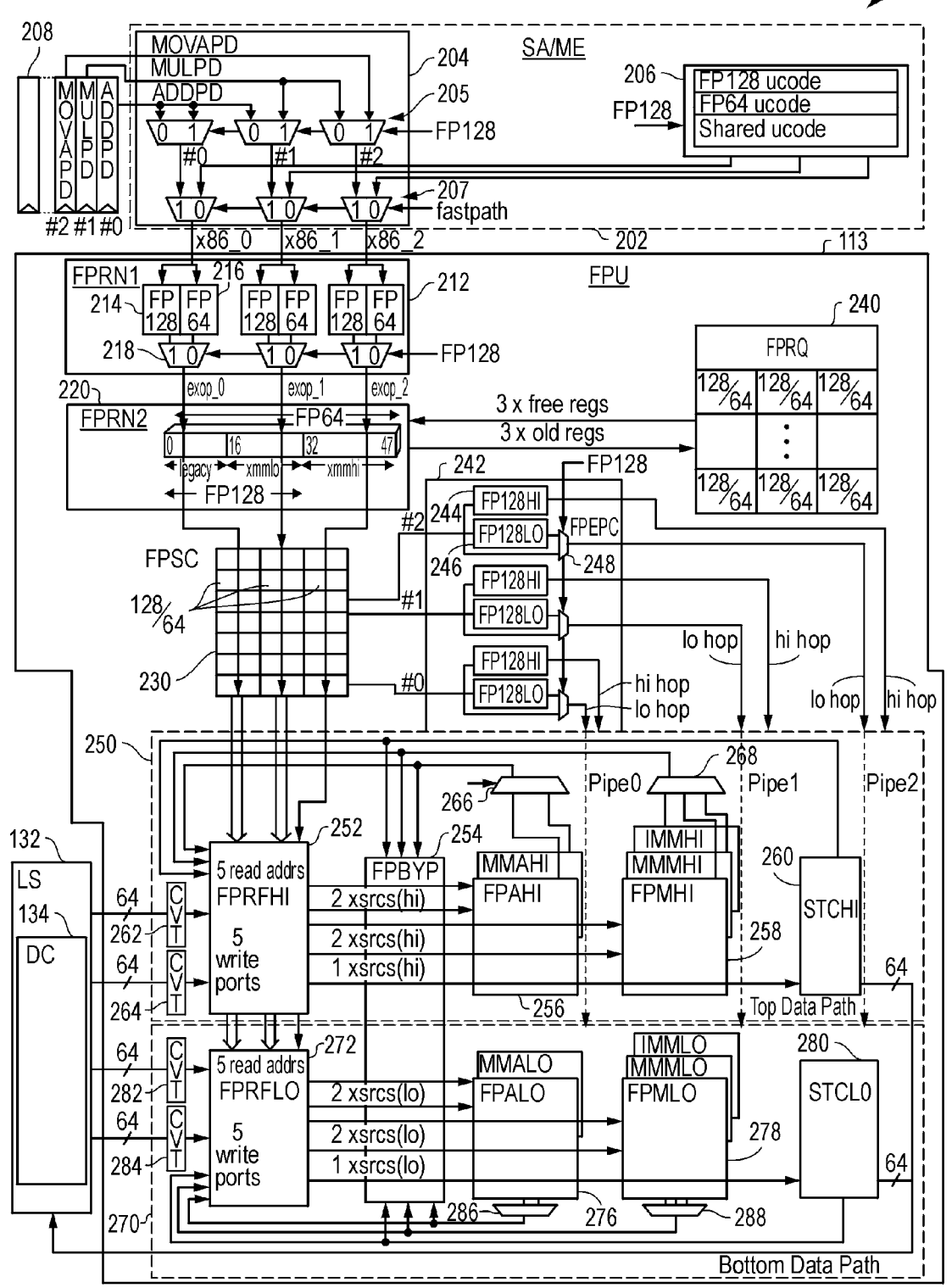
FIG. 2 is an electrical block diagram of a relevant portion of a floating point unit (FPU) of the processor of FIG. 1.

With reference to FIG. 2, a relevant portion of the processor 100 of FIG. 1 is further depicted. As noted above, the fetch/decode control unit 104 (FIG. 1) causes one or more cache lines of instructions (e.g., SSE instructions) to be fetched from the cache 102 and decoded by the instruction decoders 106. In a typical architecture, each of the cache lines includes multiple instructions. In one embodiment, the instruction decoders 106 are configured to decode three instructions at a time. It is, however, contemplated that the disclosed techniques are equally applicable to a processor that decodes more or less than three instructions at a time. While the discussion herein is primarily directed to SSE instructions, it is contemplated that the disclosed techniques are broadly applicable to a processor executing any instruction set architecture (ISA), e.g., SSE2, SSE3, SSSE3, SSE4, MMX, 3DNOW!™, etc. The decoded instructions (operations), provided by the decoders 106, are stored within an instruction queue 208 located within, for example, the instruction control unit (ICU) 108. As noted above, the indicator 110 dictates how the fetch/decode control unit 104 configures the instruction decoders 106 to decode instructions fetched from the cache 102.

In a disclosed embodiment, the indicator 110 provides a logic signal (FP128 signal) that indicates how the FPU 113 is configured and, thus, how an instruction is to be treated. The FP128 signal is distributed to a number of different logic blocks to control how the FPU 113 operates. For example, when the FP128 signal is asserted a full-bit mode is indicated and the FPU 113 is configured to include both top and bottom data paths 250 and 270 and, as such, the FPU 113 is configured to execute 128-bit operations of 128-bit instructions. In this case, each 128-bit instruction is decoded into one operation. When the FP128 signal is not asserted a reduced-bit mode is indicated and the FPU only utilizes the bottom data path 270, irrespective of whether both the top and bottom data paths 250 and 270 are included within the processor 100.

When the FP128 signal is not asserted, the FPU 113 is configured to execute 64-bit operations and, as such, the instruction decoders 106 crack each 128-bit instruction into two 64-bit operations. A scan aligner/microcode engine (SA/ME) 202 includes an SA 204 and an ME 206 and may, for example, be included within the ICU 108. The SA 204 is configured to pull instructions from the instruction queue 208, as needed during operation of the processor 100. For example, the SA 204 may pull three instructions at a time from the instruction queue 208. It should be appreciated that the techniques disclosed herein are broadly applicable to processors that are capable of pulling more or less than three instructions from an instruction queue per processor cycle.

As is illustrated, the SA 204 is configured to pull and dispatch three fastpath (i.e., non-microcoded) instructions per processor cycle. In the illustrated embodiment, the instructions are ADDPD, MULPD, and MOVAPD, which represent a packed-double addition instruction, a packed-double multiply instruction, and a packed-double move instruction, respectively. Assuming that the FP128 signal is asserted (i.e., the FPU 113 is in 128-bit mode), inputs labeled '1' on upper multiplexers 205 of the SA 204 are provided on associated outputs of the upper multiplexers 205. In the 128-bit mode, three 128-bit instructions are dispatched at a time. On the other hand, if the FP128 signal is not asserted (i.e., the FPU 113 is in 64-bit mode), inputs labeled '0' one each of the upper multiplexers 205 of the SA 204 are provided on associated outputs of the upper multiplexers 205. In this case, two operations (i.e., ADDLO and ADDHI) for the ADDPD instruction are provided at slots 0 and 1, respectively, as the 128-bit instruction is cracked into two 64-bit operations. Furthermore, a first operation (MULLO) for the MULPD instruction is provided at slot 2.

Thus, in the 64-bit mode, one and one-half (1.5) 128-bit instructions are dispatched per processor cycle. In a next processor cycle, a second operation (MULHI) for the MULPD instruction is provided in slot 0 and two operations (MOVALO and MOVAHI) for the MOVAPD instruction are provided in slots 1 and 2, respectively. Thus, in the 64-bit mode example, in a first processor cycle ADDLO, ADDHI, and MULLO are dispatched. In a following second processor cycle, MULHI, MOVALO, and MOVAHI are dispatched. It should be noted that the configuration of the multiplexers 205 of FIG. 2 is applicable to the first processor cycle in the 64-bit mode. In sum, in the 128-bit mode, three 128-bit fastpath instructions (e.g., three x86 SSE instructions) may be dispatched each cycle. Similarly, in 64-bit mode, one and one-half 128-bit fastpath instructions (e.g., 1.5 128-bit x86 SSE instructions) may be dispatched each processor cycle.

As is illustrated, the microcode engine (ME) 206, which may include an appropriate sized read-only memory (ROM), provides microcode for non-fastpath instructions. The ME 206 may include 128-bit microcode, 64-bit microcode, or shared microcode (i.e., microcode that is shared between 128-bit and 64-bit instructions). The instruction decoders 106 determine whether an instruction is a fastpath instruction or one that requires microcode. When a microcoded instruction is indicated, the ME 206 provides operations to inputs of three lower multiplexers 207 included within the SA 204. The fastpath signal is provided from the instruction decoders 106 to select lines of the three lower multiplexers 207. All of the three lower multiplexers 207 point the same way and provide either fastpath or microcoded operations. For example, assuming a next instruction out of the instruction queue 208 is a complex instruction (e.g., a floating point sine (FSIN) instruction), no other instructions are pulled from the instruction queue 208 until all operations corresponding to the microcoded instruction have been pulled from the ME 206.

Upon detection of a microcoded instruction, an entry point into the microcode is generated that corresponds to the microcoded instruction. One or more lines of operations are then read out the ME 206 until all of the operations corresponding to the microcoded instruction have been read. For example, the ME 206 may include three operations per line. In at least one embodiment, a fastpath instruction cannot be dispatched during the same processor cycle as a microcoded instruction. In this case, bubbles in the slots out of the SA/ME 202 may occur. It should be appreciated that a designer may reduce or eliminate bubbles by implementing logic to predict the use of microcode and the number of operations corresponding to a complex instruction. In general, a microcoded instruction has more than two associated operations. In a typical case, an instruction with only two operations may be implemented as a fastpath double instruction. Following the end of a microcode sequence corresponding to the microcoded instruction, a next instruction may then be pulled from the instruction queue 208. It should be appreciated that at this point, operations are not dispatched based upon available resources.

Depending upon the processor architecture, resources may be slot specific. For example, integer units may have dedicated resources that are only available in certain slots. For example, an integer unit may include an integer multiplier that is only present on slot 0. In this case, a microcode programmer would need to ensure that an integer multiply operation is not put in slot 1 or 2. Moreover, when a shared resource only exists on an integer side, a microcode programmer would need to ensure that the resource is available in an assigned slot for the operation that required the resource. In general, floating point operations that do not share resources with the integer side can go to any slot. It should be appreciated that once the operations reach a scheduler, the operations may be rearranged and executed out-of-order based upon available resources.

In one embodiment, the operations provided by the SA/ME 202 are x86 operations. The operations on slots 0, 1, and 2 of the SA/ME 202 are provided to slots 0, 1, and 2 of floating point rename 1 (FPRN1) unit 212, which may be included within the FPU stack map/rename unit 120. The FPRN1 unit 212, among other functions, assigns each operation to an appropriate pipe (e.g., pipe0, pipe1, or pipe2). The FPRN1 unit 212 includes 128-bit decoders 214 and 64-bit decoders 216 on each of the slots 0, 1, and 2. The decoders 214 decode the x86 operations into execute operations (exop_0, exop_1 and exop_2) for 128-bit operations. Similarly, the decoders 216 decode the x86 operations into execute operations for 64-bit operations. The execute operations have their own condensed opcode (operational code) space, register space, address space, etc., and may be, for example, 12-bit execute operations. The FP128 signal dictates which of the decoders 214 and 216 are selected, based upon the configuration of the FPU 113.

If the FP128 signal is asserted, multiplexers 218 select the decoders 214. If the FP128 signal is not asserted, the multiplexers 218 select the decoders 216. The mnemonics for the illustrated execute operations are FPKADDPD, FPKMULPD, FPKMOVPD, which correspond to the illustrated x86 operations ADDPD, MULPD, and MOVAPD, respectively. The execute operations are provided on each of the slots from the FPRN1 unit 212 to the floating point rename 2 (FPRN2) unit 220. Both the FPRN1 unit 212 and the FPRN2 unit 220 may be implemented within the FPU stack map/rename unit 120. In the FPRN2 unit 220, the execute operations are mapped from logical rename (LRN) space to physical rename (PRN) space. In one embodiment, the FPRN2 unit 220 includes a register file that has 48 entries (0-47). In this embodiment, in 128-bit mode only the upper 32 (0-31) entries are used and in 64-bit mode all 48 entries are used. In 128-bit mode, each SSE register has just one entry (from 16 to 31). In 64-bit mode each SSE register has two entries (from 16-47) as the registers are treated as half registers. In 64-bit mode, all the register designations have a low (e.g., xmm0.lo) designation and a high (e.g., xmm0.hi) designation. The low designations correspond to entries 16-31 and the high designations correspond to entries 32-47.

The FPRN2 unit 220 communicates with a floating point retire queue (FPRQ) unit 240, which may be included within the FPU stack map/rename unit 120, to return old registers to a free register list and to receive new registers from the free register list. The FPRQ unit 240 has either 128-bit or 64-bit slots, based on the mode of the processor. For example, if the processor is in 128-bit mode, 3 instructions would take 3 slots. On the other hand, if the processor is in 64-bit mode, 1.5 instructions (e.g., ADDLO, ADDHI, and MULLO) would occupy 3 slots of the FPRQ unit 240. Outputs of the FPRN2 unit 220 are provided to a floating point unit scheduler (FPSC) 230 that is configured to, for example, include thirty-six entries. The FPSC 230 is configured to pick operations depending upon resource availability.

The operations, depending upon dependencies, can be issued out-of-order to an appropriate pipe (i.e., pipe0, pipe1, or pipe2 in the disclosed example). In a disclosed embodiment, three independent operation pickers, one for each pipe, are employed in the FPSC 230. Each of the pickers examines the entries in the FPSC 230 to locate an operation that may be issued to an associated pipe. The pipe assigned to each execute operation is one of the pieces of information that is written into the FPSC 230 with an associated execute operation. In one embodiment, if a picker finds more than one execute operation that is ready for execution, the picker chooses the oldest execute operation. The FPSC 230 may maintain age ordering by positioning a youngest operation at a top of a queue and an oldest operation at a bottom of the queue. Picked operations are provided to a floating point exception pipeline control (FPEPC) unit 242. The FPSC 230 and the FPEPC unit 242 may be included within the FPU scheduler 122.

As is illustrated, data addresses are provided from the FPSC 230 to a floating point register file 124, which may include a floating point register file high (FPRFHI) 252 in the top data path 250 and a floating point register file low (FPRFLO) 272 in the bottom data path 270. Depending upon the embodiment, the top data path 250 may not be implemented, or if implemented may not be utilized. The data paths 250 and 270 each include a floating point register file (FPRFHI 252 and FPRFLO 272, respectively), share a floating point bypass (FPBYP) unit 254, include a first pipe (including a floating point add (FPA) unit and an MMX ALU (MMA) unit), include a second pipe (including a floating point multiply (FPM) unit, an MMX multiplier (MMM) unit and an MMX integer multiplier (IMM) unit) and include a third pipe (including a store control (STC) unit). It should be appreciated that different or additional units may be implemented within the pipes. In the illustrated embodiment, five read addresses (corresponding to five data sources, i.e., two for the FPA/MMA units, two for the FPM/MMM/IMM units, and one for STC units) are provided to a floating point register file (FPRF), which may include the FPRFHI 252 and the FPRFLO 272.

The FPEPC unit 242 receives a N-bit, e.g., 12-bit, opcode (and additional control information) for each of the execution operations for each of the slots (i.e., slots 0, 1, and 2). The FPEPC unit 242 includes a decoder (FP128HI) 244, a decoder (FP128LO) 246, and a multiplexer 248 for each of the slots, i.e., slots 0, 1, and 2 An execute operation for a 128-bit instruction may be split into two half operations (hops). In this case, an execute operation has an associated high half operation (hi hop) and a low half operation (lo hop). Typically, the hi hop is identical to the lo hop. However, for certain execute operations the hi hop and the lo hop are not identical.

The decoders 244 and 246 function to provide the hi hops and lo hops, respectively, when the hi hops and lo hops are not identical. Assuming the processor 100 is configured in the 64-bit mode, the multiplexers 248 select the feed-through path (i.e., does not use the decoders 244 and 246). In this case, the execution operations feed-through unchanged and the operations are provided to the bottom data path 270, i.e., FPALO/MMALO units 276 (pipe0), FPMLO/MMMLO/IMMLO units 278 (pipe1), and STCLO unit 280 (pipe2) for execution.

When the processor 100 is configured in the 128-bit mode, the multiplexers 248 select the decoders 246 and the decoders 244 and 246 are employed on all of the slots. In this case, the low half operations (lo hops) are provided to the bottom data path 270, i.e., the FPALO/MMALO units 276 (pipe0), the FPMLO/MMMLO/IMMLO units 278 (pipe1), and the STCLO unit 280 (pipe2), and the high hops (hi hops) are provided to the top data path 250, i.e., FPAHI/MMAHI units 256 (pipe0), FPMHI/MMMHI/IMMHI 258 units (pipe1), and STCHI unit 260 (pipe2) for execution.

Data from the STC units 260 and 280, which may be implemented within the STC 126, is provided to the LS unit 132. The load data in the LS unit 132 is provided to the FPU register file 124 through converters 262, 264, 282, and 284 when the FPU register file 124 includes the FPRFHI 252 and the FPRFLO 272. The converters 262, 264, 282, and 284 are provided to convert load data from 64-bit data into, for example, 90-bit data. Result data from an appropriate unit of pipe0 and pipe1 in the top data path 250 is selected by multiplexers 266 and 268, respectively. Similarly, result data from an appropriate unit of pipe0 and pipe1 in the bottom data path 270 is selected by multiplexers 286 and 288, respectively.

Figure 3:
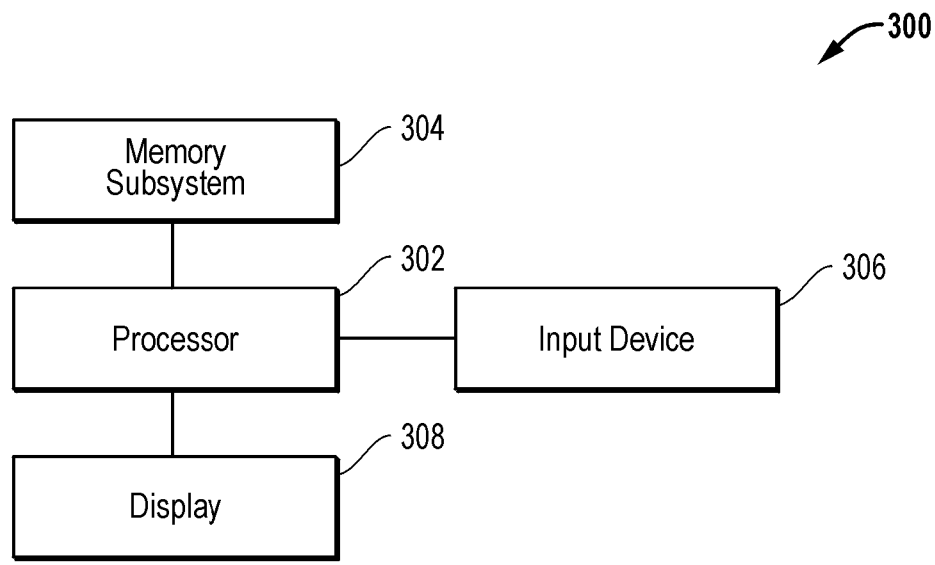
FIG. 3 is an electrical block diagram of a relevant portion of a computer system that includes a processor configured according to FIG. 2.

Moving to FIG. 3, a computer system 300 is illustrated that includes a processor 302 that may include one or more processors configured in accordance with the processor shown in FIGS. 1 and 2. The processor 302 is coupled to a memory subsystem 304, which includes an application appropriate amount of volatile and non-volatile memory. The processor is also coupled to an input device 302, e.g., a mouse, keyboard, etc., and a display, e.g., a liquid crystal display (LCD).

Figure 4:
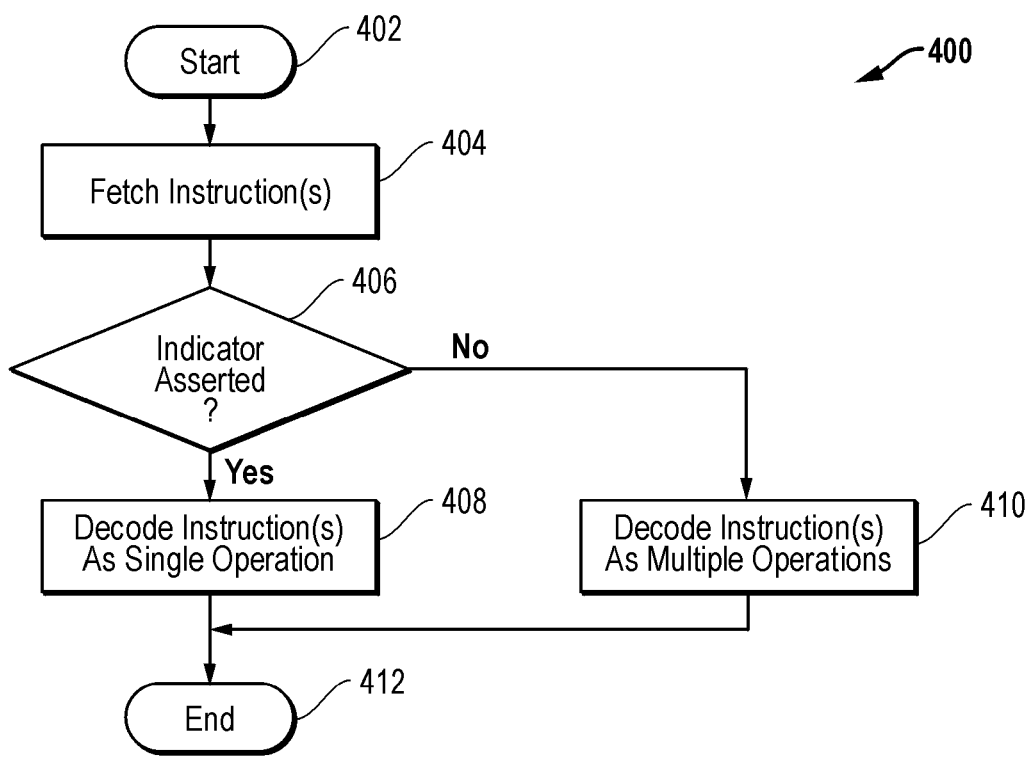
FIG. 4 is a flow chart of a process for decoding instructions based on an indicator.

Turning to FIG. 4, a decoding routine 400 for determining how an instruction is to be decoded is illustrated. In block 402 the routine 400 is initiated, at which point control transfers to block 404, where one or more instructions are fetched. Next, in decision block 406, it is determined whether an indicator, e.g. a register, is asserted. If the indicator is asserted control transfers from block 406 to block 408, where the fetched instructions are decoded as a single operation. Following block 408, control transfers to block 412 where the routine 400 terminates. In block 406, when the indicator is not asserted, control transfer to block 410, where the fetched instruction is decoded as multiple operations. Following block 410, control transfers to block 412.

Accordingly, techniques have been disclosed herein that allow a fetched instruction to be decoded into a single operation or multiple operations. For example, a 128-bit instruction may be decoded into a single 128-bit operation or two 64-bit operations based on an indicator.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method, comprising:
    determining whether a floating point unit (FPU) of a processor is to operate in full-bit mode or a reduced-bit mode;
    fetching an instruction;
        in response to determining the FPU is to operate in the full-bit mode, decoding the instruction into a single operation; and
        in response to determining the FPU is to operate in the reduced-bit mode, decoding the instruction into multiple operations.

2. The method of claim 1, wherein the determining further comprises:
    determining, based on an indicator, whether the processor is to operate in the full-bit mode or the reduced-bit mode.

3. The method of claim 2, further comprising:
    setting or clearing the indicator to select the full-bit mode.

4. The method of claim 2, wherein the indicator is provided by a register or a fuse.

5. The method of claim 4, further comprising:
    blowing the fuse to select the full-bit mode or the reduced-bit mode.

6. The method of claim 2, further comprising:
    setting or clearing the indicator to select the reduced-bit mode.

7. The method of claim 1, wherein the instruction is a 128-bit instruction, the full-bit mode is a 128-bit mode, and the reduced-bit mode is a 64-bit mode and the determining further comprises:
    determining whether the processor is to operate in the 128-bit mode or the 64-bit mode.

8. The method of claim 7, wherein the decoding further comprises:
    decoding, based on the determining, the 128-bit instruction into one operation for the 128-bit mode or two operations for the 64-bit mode.

9. The method of claim 1, wherein the single operation corresponds to one 128-bit operation and the multiple operations correspond to two 64-bit operations.

10. A processor, comprising:
    an indicator;
    a decoder coupled to the indicator, wherein the decoder is configured to decode an instruction into a single operation or multiple operations based on the indicator; and
    a floating point unit (FPU) coupled to the decoder, wherein the floating point unit (FPU) is configured to begin execution of the single operation in one processor cycle or the multiple operations in one or more processor cycles based on the indicator.

11. The processor of claim 10, wherein the instruction is a 128-bit instruction and the decoder is configured to decode the 128-bit instruction into the single operation corresponding to a 128-bit operation or the multiple operations corresponding to two 64-bit operations based on the indicator.

12. The processor of claim 11, wherein the indicator is a register or a fuse.

13. The processor of claim 10, wherein the multiple operations includes two operations and the floating point unit (FPU) further comprises:
    a bottom data path, wherein the bottom data path is configured to begin execution of both of the two operations in one or more processor cycles.

14. The processor of claim 10, wherein the floating point unit (FPU) further comprises:
    a top data path configured to execute a first one-half of the single operation; and
    a bottom data path configured to execute a second one-half of the single operation.

15. The processor of claim 14, further comprising:
    a common control section coupled to the top data path and the bottom data path.

16. A system, comprising:
    an indicator;
    a processor coupled to the indicator, the processor comprising:
        a decoder coupled to the indicator, wherein the decoder is configured to decode an instruction into a single operation or multiple operations based on the indicator; and
        a floating point unit (FPU) coupled to the decoder, wherein the floating point unit (FPU) is configured to begin execution of the single operation in one processor cycle or the multiple operations in one or more processor cycles based on the indicator; and
    a memory subsystem coupled to the processor.

17. The system of claim 16, wherein the floating point unit (FPU) further comprises:
    a first data path including at least one first execution unit, wherein the first data path is configured to execute a low half operation (lo hop) associated with the single operation or all of the multiple operations associated with the instruction.

18. The system of claim 17, further comprising:
    a second data path including at least one second execution unit, wherein the second data path is configured to execute a high half operation (hi hop) associated with the single operation.

19. The system of claim 18, further comprising:
    a common control section coupled to and configured to control operation of both of the first and second data paths.

20. The system of claim 16, wherein the indicator is a register or a fuse.

* * * * *